(12) United States Patent
Mays

(10) Patent No.: US 12,717,668 B2
(45) Date of Patent: Aug. 25, 2026

(54) REAL-TIME MAINFRAME NETWORK MANAGEMENT

(71) Applicant: Bank of America Corporation, Charlotte, NC (US)

(72) Inventor: Kenneth Mays, Lewisville, TX (US)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 18/380,593

(22) Filed: Oct. 16, 2023

(65) Prior Publication Data

US 2025/0123917 A1 Apr. 17, 2025

(51) Int. Cl.
*G06F 11/07* (2006.01)

(52) U.S. Cl.
CPC ...... *G06F 11/0757* (2013.01); *G06F 11/0709* (2013.01)

(58) Field of Classification Search
CPC ......................... G06F 11/0757; G06F 11/0709
See application file for complete search history.

(56) References Cited

U.S. PATENT DOCUMENTS 11,836,148 B1 * 12/2023 Boster .................. G06F 16/248
2016/0259709 A1 * 9/2016 Anand .................. G06F 16/248

OTHER PUBLICATIONS

Fault Detection, Diagnosis, and Prognosis (Year: 2007).*
Constructing the Knowledge Base for Cognitive (Year: 2017).*
A Controller Archetecture for an Anomaly (Year: 2019).*
IBM Invoking REXX Execs and CLISTS for an IPCs (Year: 2021).*

* cited by examiner

*Primary Examiner* — Bryce P Bonzo
*Assistant Examiner* — Audrey Emma Whitesell
(74) *Attorney, Agent, or Firm* — Weiss & Arons LLP

(57) ABSTRACT

Methods, apparatus, and systems for active and passive monitoring of a mainframe network are provided. The methods may include monitoring, using a mainframe management system, one or more individual applications executing on the mainframe network. The methods may include receiving, at the mainframe management system, a set of search parameters. The methods may include inputting the set of search parameters into a search function within the mainframe management system. The methods may include executing a search corresponding to the set of search parameters. The methods may include identifying a data entry list. The data entry list may include data lines that correspond, over a threshold value of similarity, to the set of search parameters. The methods may include outputting, in real-time, the data entry list. The method may include displaying the data entry list on a display operating in tandem with the mainframe management system.

7 Claims, 12 Drawing Sheets

302

```
BANK USA 6X04 Mainframe View  N6X04 LMT005K
C N6X04  NO NEWS TO DISPLAY - ENTER CMD 'BNEWS' AT ANY TIME FOR CS RELATED NEWS
* N6X04  TCPHOSTN
C N6X04  01.00.06 STC01859 EZZ0614I HOST NAME FOR TCPIP IS 6X04
```

Figure 5A:
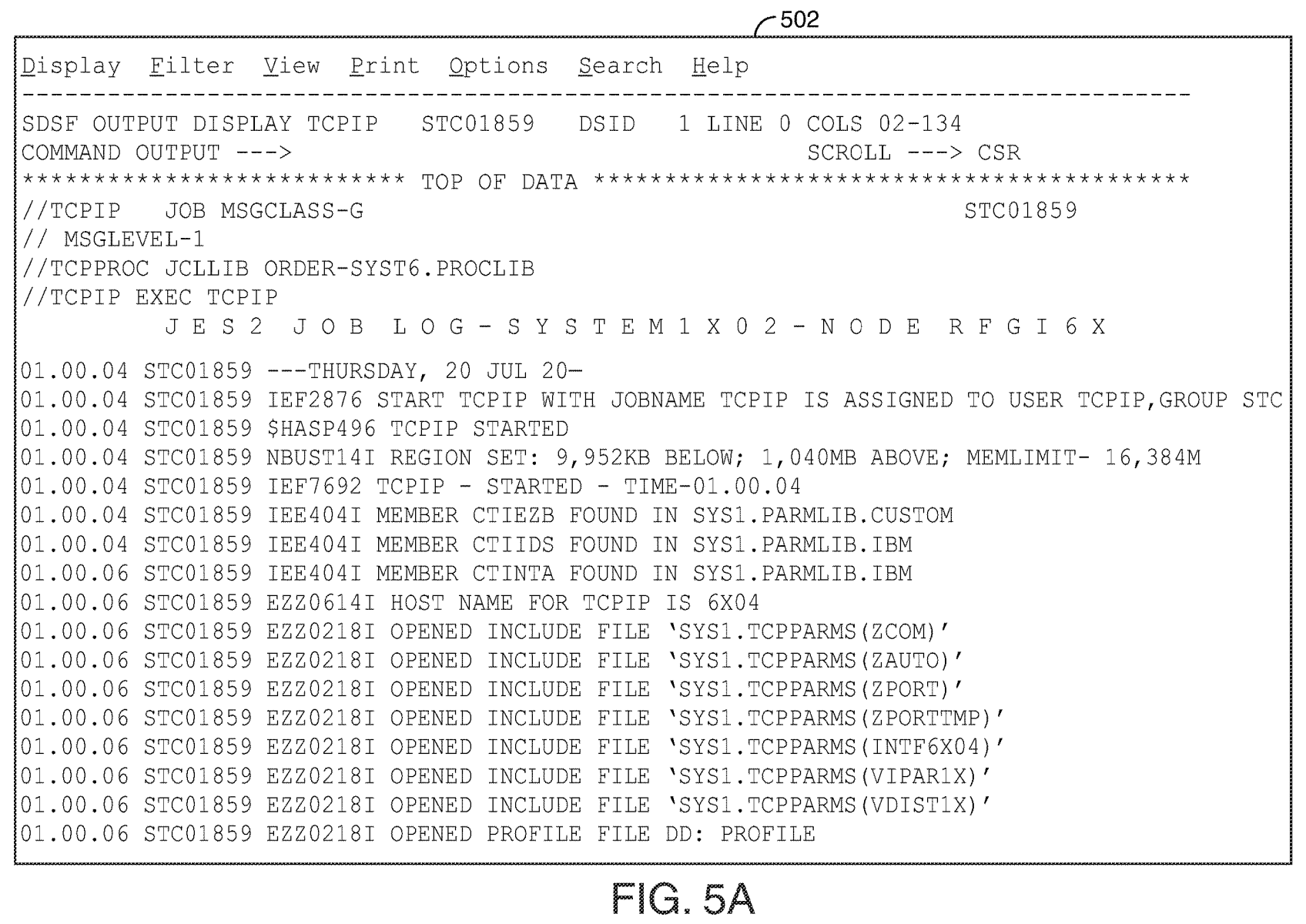

```
Display  Filter  View  Print  Options  Search  Help
-----------------------------------------------------------------------------------
SDSF OUTPUT DISPLAY TCPIP   STC01859   DSID   1 LINE 0 COLS 02-134
COMMAND OUTPUT --->                                    SCROLL ---> CSR
*************************** TOP OF DATA *****************************************
//TCPIP   JOB MSGCLASS-G                                          STC01859
// MSGLEVEL-1
//TCPPROC JCLLIB ORDER-SYST6.PROCLIB
//TCPIP EXEC TCPIP
          J E S 2  J O B  L O G - S Y S T E M 1 X 0 2 - N O D E  R F G I 6 X

01.00.04 STC01859 ---THURSDAY, 20 JUL 20-
01.00.04 STC01859 IEF2876 START TCPIP WITH JOBNAME TCPIP IS ASSIGNED TO USER TCPIP,GROUP STC
01.00.04 STC01859 $HASP496 TCPIP STARTED
01.00.04 STC01859 NBUST14I REGION SET: 9,952KB BELOW; 1,040MB ABOVE; MEMLIMIT- 16,384M
01.00.04 STC01859 IEF7692 TCPIP - STARTED - TIME-01.00.04
01.00.04 STC01859 IEE404I MEMBER CTIEZB FOUND IN SYS1.PARMLIB.CUSTOM
01.00.04 STC01859 IEE404I MEMBER CTIIDS FOUND IN SYS1.PARMLIB.IBM
01.00.06 STC01859 IEE404I MEMBER CTINTA FOUND IN SYS1.PARMLIB.IBM
01.00.06 STC01859 EZZ0614I HOST NAME FOR TCPIP IS 6X04
01.00.06 STC01859 EZZ0218I OPENED INCLUDE FILE 'SYS1.TCPPARMS(ZCOM)'
01.00.06 STC01859 EZZ0218I OPENED INCLUDE FILE 'SYS1.TCPPARMS(ZAUTO)'
01.00.06 STC01859 EZZ0218I OPENED INCLUDE FILE 'SYS1.TCPPARMS(ZPORT)'
01.00.06 STC01859 EZZ0218I OPENED INCLUDE FILE 'SYS1.TCPPARMS(ZPORTTMP)'
01.00.06 STC01859 EZZ0218I OPENED INCLUDE FILE 'SYS1.TCPPARMS(INTF6X04)'
01.00.06 STC01859 EZZ0218I OPENED INCLUDE FILE 'SYS1.TCPPARMS(VIPAR1X)'
01.00.06 STC01859 EZZ0218I OPENED INCLUDE FILE 'SYS1.TCPPARMS(VDIST1X)'
01.00.06 STC01859 EZZ0218I OPENED PROFILE FILE DD: PROFILE
```

```
01.00.06 STC01859 EZZ0227I PROFILE PROCESSING BEGINNING FOR DD:PROFILE
01.00.06 STC01859 EZZ0227I PROFILE PROCESSING BEGINNING FOR SYS1.TCPPARMS(ZCOM)
01.00.06 STC01859 EZZ0234I PROFILE PROCESSING COMPLETE FOR FILE "SYS1.TCPPARMS(ZCOM)'
01.00.06 STC01859 EZZ0222I RESUMING PROCESSING OF FILE DD:PROFILE
01.00.06 STC01859 EZZ0227I PROFILE PROCESSING BEGINNING FOR SYS1-TCPPARMS(ZAUTO)
01.00.06 STC01859 EZZ0234I PROFILE PROCESSING COMPLETE FOR FILE "SYS1.TCPPARMS(ZAUTO)'
01.00.06 STC01859 EZZ0222I RESUMING PROCESSING OF FILE DD:PROFILE
01.00.06 STC01859 EZZ0227I PROFILE PROCESSING BEGINNING FOR SYS1,TCPPARMS(ZPORT)
01.00.07 STC01859 EZZ0413I PORT 56565 UDP QP* IS ALREADY RESERVED
01.00.07 STC01859 EZZ0234I PROFILE PROCESSING COMPLETE FOR FILE "SYS1.TCPPARMS(ZPORT)'
01.00.07 STC01859 EZZ0222I RESUMING PROCESSING OF FILE DD:PROFILE
01.00.07 STC01859 EZZ0227I PROFILE PROCESSING BEGINNING FOR SYS1-TCPPARMS(ZPORTTMP)
01.00.07 STC01859 EZZ0234I PROFILE PROCESSING COMPLETE FOR FILE "SYS1.TCPPARMS(ZPORTTMP)'
```

```
BANK-USA 6X04 Mainframe View   N6X04 LMT005L
* N6X04  TCPHOSTN
C N6X04   01.00.06 STC01859 EZZ0614I HOST NAME FOR TCPIP IS 6X04
* N6X04  RO 1S TCPHONSTN
¦ N6X04
¦ N6X04 USNBNET.N1R0L. 1S0C Results:
C N1R0L   00.15.52 STC68047 EZZ0614I HOST NAME FOR TCPIP IS PROD1R0L
¦ N6X04
¦ N6X04 USNBNET.N1R0K. 1ROK Results:
C N1R0K   00.34.52 STC66993 EZZ0614I HOST NAME FOR TCPIP IS PROD1ROK
¦ N6X04
¦ N6X04 USNBNET.N1R0P. 1S0E Results:
C N1R0P   00.16.26 STC6862 EZZ0614I HOST NAME FOR TCPIP IS PROD1R0P
¦ N6X04
¦ N6X04 USNBNET.N1R0M. 1R0M Results:
C N1R0M   00.56.41 STC6895 EZZ0614I HOST NAME FOR TCPIP IS PROD1R0M
¦ N6X04
¦ N6X04 USNBNET.N1R08. 1R08 Results:
C N1R08   00.23.03 STC64651 EZZ0614I HOST NAME FOR TCPIP IS PROD1R08
¦ N6X04
¦ N6X04 USNBNET.N1R04. 1R04 Results:
C N1R04   01.56.46 STC65875 EZZ0614I HOST NAME FOR TCPIP IS PROD1R04
¦ N6X04
¦ N6X04 USNBNET.N1R06. 1R06 Results:
C N1R06   00.25.40 STC64186 EZZ0614I HOST NAME FOR TCPIP IS PROD1R06
¦ N6X04
¦ N6X04 USNBNET.N1R02. 1R02 Results:
C N1R02   00.20.43 STC68707 EZZ0614I HOST NAME FOR TCPIP IS PROD1R02
¦ N6X04
¦ N6X04 USNBNET.N1R09. 1R09 Results:
C N1R09   02.27.21 STC61447 EZZ0614I HOST NAME FOR TCPIP IS PROD1R09
¦ N6X04
¦ N6X04 USNBNET.N1R03. 1R03 Results:
C N1R03   01.07.55 STC69343 EZZ0614I HOST NAME FOR TCPIP IS PROD1R03
¦ N6X04
¦ N6X04 USNBNET.N1R05. 1R05 Results:
C N1R05   01.46.22 STC63564 EZZ0614I HOST NAME FOR TCPIP IS PROD1R05
¦ N6X04
¦ N6X04 USNBNET.N1R01. 1R01 Results:
C N1R01   03.13.46 STC67658 EZZ0614I HOST NAME FOR TCPIP IS PROD1R01
??? ***
```

Figure 7:
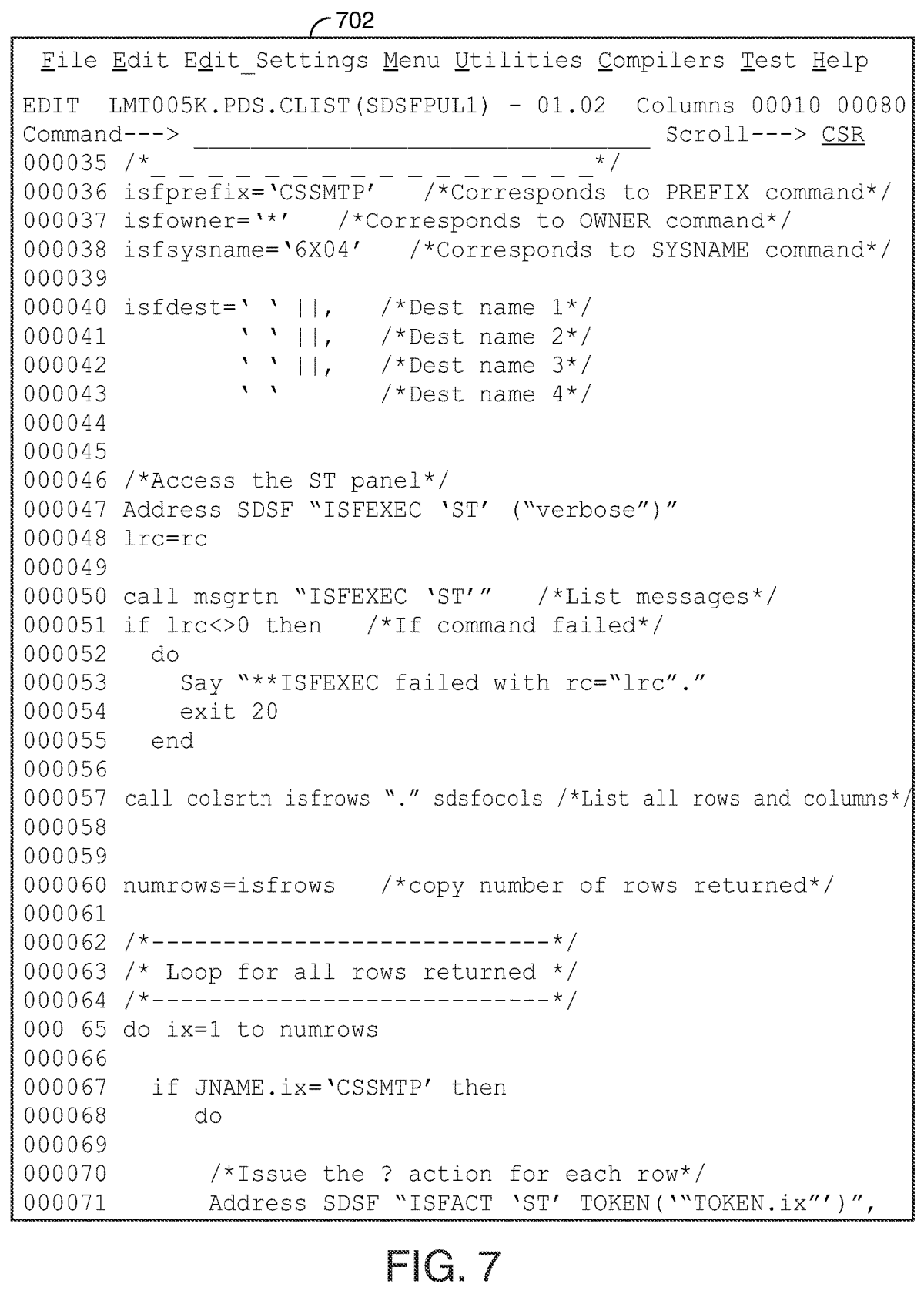

```
 File Edit Edit_Settings Menu Utilities Compilers Test Help
EDIT  LMT005K.PDS.CLIST(SDSFPUL1) - 01.02  Columns 00010 00080
Command---> _________________________________ Scroll---> CSR
/*_ _ _ _ _ _ _ _ _ _ _ _ _ _ _ _ _ _ _ _ _*/
isfprefix='CSSMTP'   /*Corresponds to PREFIX command*/
isfowner='*'   /*Corresponds to OWNER command*/
isfsysname='6X04'   /*Corresponds to SYSNAME command*/
isfdest=' ' ||,   /*Dest name 1*/
        ' ' ||,   /*Dest name 2*/
        ' ' ||,   /*Dest name 3*/
        ' '       /*Dest name 4*/
/*Access the ST panel*/
Address SDSF "ISFEXEC 'ST' ("verbose")"
lrc=rc
call msgrtn "ISFEXEC 'ST'"   /*List messages*/
if lrc<>0 then   /*If command failed*/
  do
    Say "**ISFEXEC failed with rc="lrc"."
    exit 20
  end
call colsrtn isfrows "." sdsfocols /*List all rows and columns*/
numrows=isfrows   /*copy number of rows returned*/
/*---------------------------*/
/* Loop for all rows returned */
/*---------------------------*/
do ix=1 to numrows
  if JNAME.ix='CSSMTP' then
     do
      /*Issue the ? action for each row*/
      Address SDSF "ISFACT 'ST' TOKEN('"TOKEN.ix"')",
```

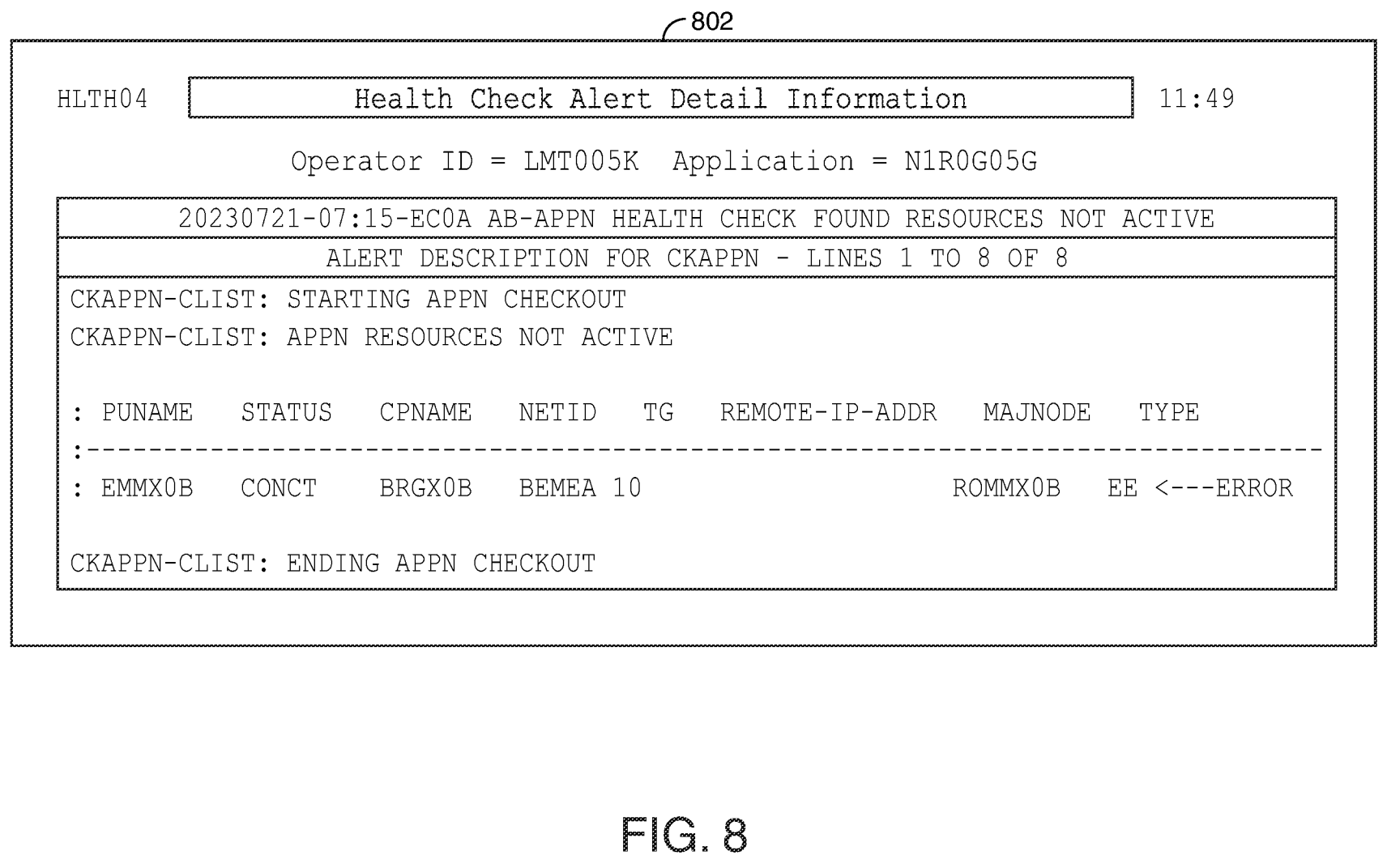

```
HLTH04        Health Check Alert Detail Information        11:49

           Operator ID = LMT005K  Application = N1R0G05G

 20230721-07:15-EC0A AB-APPN HEALTH CHECK FOUND RESOURCES NOT ACTIVE
        ALERT DESCRIPTION FOR CKAPPN - LINES 1 TO 8 OF 8
CKAPPN-CLIST: STARTING APPN CHECKOUT
CKAPPN-CLIST: APPN RESOURCES NOT ACTIVE

: PUNAME   STATUS   CPNAME   NETID   TG   REMOTE-IP-ADDR   MAJNODE   TYPE
:-------------------------------------------------------------------------------
: EMMX0B   CONCT    BRGX0B   BEMEA 10                   ROMMX0B   EE <---ERROR

CKAPPN-CLIST: ENDING APPN CHECKOUT
```

FIG. 8

```
Mainframe View.BRWS------BROWSE BTBL$$(DSIPARM)---LINE 01181 TO 01216 OF 01553
                                                             SCROLL ==> CSR
----+----1----+----2----+----3----+----4----+----5----+----6----+----7----+----
*                                                                       04239600
   IF MSGID='BNH464E' & TEXT-MSGPARMS                                   04239700
   THEN EXEC(CMD('AUTOLGR ' MSGPARMS) ROUTE(ONE AUTOLGR))               04239800
      NETLOG(Y) CONTINUE(STOP);                                         04239900
*                                                                       04240000
   IF MSGID='BNH466E' & TEXT-MSGPARMS                                   04241000
   THEN EXEC(CMD('AUTOLGR ' MSGPARMS) ROUTE(ONE AUTOLGR))               04250000
      NETLOG(Y) CONTINUE(STOP);                                         04251000
  END;                                                                  04252000
*                                                                       04260000
*********************************************************************** 04360000
* PENDING DOC UPDATE (or potential deletion)                            04270000
* capture ezz1538i mlwto and trigger idsevent program. idsevent will    04380000
* issue cs#99019 messages.                                              04390000
*                                                                       04391000
 IF (LABEL: EZZ60BLOK)MSGID = 'EZZ'. THEN                               04400000
   BEGIN                                                                04401000
     IF MSGID='EZZ1538I' & TEXT=MSGPARMS                                04410000
     THEN EXEC(CMD('IDSEVENT ' MSGPARMS) ROUTE(ONE AUTO9))              04420000
     CONTINUE(STOP);                                                    04420100
* PENDING DOC UPDATE                                                    04421000
* capture msg ezz7354e for omproute not responsive for 30 seconds       04422000
*                                                                       04423000
   IF MSGID='EZZ7354E' & TEXT-MSGPARMS                                  04424000
   THEN EXEC(CMD('AUTOLGR ' MSGPARMS) ROUTE(ONE AUTOLGR))               04425000
      NETLOG(Y) CONTINUE(STOP);                                         04426000
```

```
* PENDING DOC UPDATE                                                   04427000
* Capture msg ezz5731i for hello interval missed on interface          04428000
*                                                                      04429000
     IF MESGID='EZZ5731I' & TEXT=MSGPARMS                              04429100
     THEN EXEC(CMD('AUTOLGR ' MSGPARMS) ROUTE(ONE AUTOLOGR))          04429200
     CONTINUE(STOP);                                                   04429300
* PENDING DOC UPDATE                                                   04429400
* Capture msg EZZ7609e for DNS Cache full                              04429500
*                                                                      04429600
     IF MSGID='EZZ7609E' & TEXT=MSGPARMS                               04429700
 CMD--->
1=HELP 2=END 3=RET 4=KYS 5=RPF 6=ROL 7=BCK 8=FWD 9=TOP 10=WIN 11=WHO 12=RTV
```

```
CNMKCZLG                      Specify Canzlog Filters

From:     '07/24/23 13:12:              To:          07/28/23 11:57:50
For:       1D 0H 0M
Tag:                                    MSGID:
Jobname:                                Jobid:
ASID:                                   ASType:
Console:                                Route Code:
Domain:                                 System ID:
AutoTok:                                Desc Code:
AuthUser:                               AuthGroup:
Opid:                                   UCHARS:
CHKey:                                  WTOKey:
Text - case sensitive; faster search:

Text - case insensitive; slower search:


Target:
Name:                Remark:

1=HLP 2=END 3=RET 4=KYS 5=LOG 6=ROL 7=BCK 8=FWD 9=TOP 10=WIN 11=ENT 12=RTV
CMD==>
```

FIG. 10

REAL-TIME MAINFRAME NETWORK MANAGEMENT

FIELD OF TECHNOLOGY

The field of technology relates to mainframe management.

BACKGROUND OF THE DISCLOSURE

Many entities execute electronic communications through large mainframe networks. The mainframe networks typically include multiple nodes. Each node may execute numerous applications. Entities may use a mainframe management system to administer, manage and control the mainframe network(s).

An application executing on, or through the mainframe network may cause a failure on the mainframe network. Because there may be numerous applications executing through the mainframe network, it may be difficult and cumbersome to identify the source of the failure. Currently, solutions for searching for application failures may be limited. Due to the enormity of mainframe systems, it may be difficult, time consuming and resource draining to locate a specific failed application.

As such, it would be desirable for an entity to be able to harness the mainframe management system to provide a system to identify failures within a mainframe management system. It would be desirable for such a system to identify sources of the identified failures.

SUMMARY OF THE DISCLOSURE

Systems, apparatus and methods for active and passive monitoring of a mainframe network are provided. Methods may include monitoring a mainframe network.

The mainframe network may include one or more servers. The mainframe network may include one or more nodes. The one or more servers may include processors that are configured to provide resources, data, services and/or programs to the one or more nodes included in the mainframe network. The one or more nodes may be computing devices. The computing devices may include desktops, laptops, printers, disk storages, peripheral devices and any other suitable computing devices. The one or more servers may be configured to process a high volume of transactions and/or input/output operations from the one or more nodes. The one or more servers may be configured to process a high volume of transactions and/or input/output operations from the one or more nodes in parallel.

The one or more servers may connect the one or more nodes. The nodes may be geographically dispersed, —i.e., located in different geographical locations. The one or more servers may process a high volume of input/output operations to disk storage, printers, peripheral devices and any other suitable computing devices. The computing devices may or may not be physically linked to the one or more servers. The computing devices may or may not be wirelessly linked to the one or more servers. The one or more servers may enable the one or more nodes to execute one or more individual applications.

The methods may include monitoring the mainframe network using a mainframe management system. The mainframe management system may include a platform for maintaining and automating the mainframe network from a single control point. The mainframe management system may include a platform for managing and accessing the one or more individual applications being executed on the one or more nodes included in the mainframe network. The mainframe management system may include a platform configured to access logs of one or more individual applications being executed on the one or more nodes included in the mainframe network. The mainframe management system may be a mainframe management system such as that available from IBM®, Armonk, New York, under the name NetView or another available from Broadcom®, San Jose, California under the name NetMaster.

The methods may include using the mainframe management system to monitor the one or more individual applications. The methods may include using the mainframe management system to monitor the one or more individual applications using live application logs of the one or more individual applications. The one or more individual applications may be executing on the nodes included in the mainframe network.

The one or more individual applications may complete many individual jobs, tasks and/or any suitable unit of work. Every job, task and/or unit of work may include a series of incremental activities. The mainframe management system may include a data logging application. The data logging application may provide supplementary job management, data management and/or task management functions. The data logging application may log the series of incremental activities for each job. The data logging application may read and/or write input/output streams of incremental activities per job on auxiliary storage devices. The data logging application may read and/or write input/output streams of incremental activities per job on auxiliary storage devices concurrently with job execution. The data logging application may print the application logs for each job. The application logs for each job may be printed in a format convenient for later processing or output operations. The data logging application may be a data logging application such as that available from IBM®, Armonk, New York, under the z/OS® operating system under the name job entry subsystem ("JES") spool.

The mainframe management system may include a command-prompt interface. Each user/stakeholder of the mainframe management system may have a unique access code to access the command-prompt interface. The command-prompt interface may include a menu driven interface. The menu driven interface may include a collection of menus and panels. The collection of menus and panels may offer a range of functions to assist users/stakeholders in working with applications being executed through the mainframe network. The command-prompt interface may enable easy interaction with the operating system of the mainframe management system. The command-prompt interface may be a command-prompt interface such as that available from IBM®, Armonk, New York, under the name "time sharing option/extension ("TSO/E")." The menu driven interface may be a menu driven interface such as that available from IBM®, Armonk, New York, under the name interactive "system productivity facility ("ISPF")."

The mainframe management system may include a search and display application programming interface ("API"). The search and display API may enable users/stakeholders of the mainframe management system to monitor, control and view logs of the jobs occurring within the mainframe network. The search and display API may enable a user to view the logs of any job included in the mainframe network. The search and display API may enable a user to search for a string in the logs of all applications executing on the mainframe network. The search and display API may enable a user to enter commands. The search and display API may monitor, display and control job processing. The search and display API may monitor, display, and control job printing. The search and display API may be a search and display API such as that available from IBM®, Armonk, New York, under the z/OS® operating system under the name system display and search facility (SDSF) Java™ API.

The monitoring may include receiving, at the mainframe management system, a set of search parameters. The set of search parameters may be received at the search and display API. The set of search parameters may be generated by a user/stakeholder of the mainframe management system. The set of search parameters may be generated by the mainframe management system. The set of search parameters may be generated by any suitable program or application. The set of search parameters may identify a desired data entry. The set of search parameters may identify a timeframe for the desired data entry. The set of search parameters may include one or more applications in which to initiate a search for the desired data entry. The set of search parameters may include any suitable search parameters.

For example, a user of the mainframe network may be standardizing host names for the nodes included in the mainframe network. Host names may include computer identification tags. The user may be standardizing the host names within transmission control protocol/Internet protocol ("TCP/IP"). The user may be notified, by the mainframe management system, of an outdated host name. The user may define a set of search parameters to locate a location of the outdated host name. The user may identify a data entry corresponding to the outdated host name. The user may identify the timeframe in which to search for the outdated host name. The user may identify a date, a week, a month, a year or any other suitable timeframe in which to search for the outdated host name. The user may identify one or more specific application(s) in which to search for the outdated host name.

The methods may include transmitting the set of search parameters into a search function. The search parameters may be transmitted through a protocol. The protocol may include virtual telecommunications access method ("VTAM®"). VTAM® may be used for legacy systems network architecture ("SNA") communications. The protocol may include TCP/IP. TCP/IP may be used for internet protocol ("IP") communications. The search function may be a function within the mainframe management system.

The search function may include an algorithm. The algorithm may be a rules-based decision-making algorithm. The algorithm may include a set of predefined rules to make decisions and perform tasks. The algorithm may include if-then rules to make decisions and perform tasks. The search function may use the algorithm to search through the live data logs of the applications to find data entries matching to the set of search parameters.

The search function may include the search and display API. The search parameters may define a search within the search and display API. The search and display API may query the data logging application for any data entries that match the search parameters.

The methods may include executing a search. The search may correspond to the set of search parameters. The search may be a search for the desired data entry. The search may be limited by the timeframe identified in the set of search parameters. The search may be a search for the desired data entry in live data logs of each of the one or more applications identified in the set of search parameters.

The methods may include identifying a data entry list. The data entry list may include data lines that may be similar but not the same as the identified/stated search parameters. For example, some data lines may match the timeframe and data entry, however the data lines may be found in an application not listed in the search parameters. Other data lines may match the data entry and the application; however, the data lines may not match the timeframe identified/stated in the search parameters. For example, a timeframe identified in the search parameters may be 00:00. The timeframe associated with the identified data line may be 00:01. The data line may correspond to all other criteria as identified/stated in the search parameters except for the timeframe.

Data lines determined to be within a range of the identified/stated search parameters may be assigned a likeness value. The likeness value may be a numerical value. The likeness value may be a numerical value such as a percentage. The numerical value may indicate similarities of the data line to the identified/stated search parameters. The higher the likeness value, the more likely it may be for a data line to match the identified/stated search parameters. For example, a likeness value for a data line that is almost the same as the identified search parameters may be 95%.

Based on the likeness values assigned to each data line, a threshold value of similarity may be determined. The threshold value of similarity may be determined by defining a cut-off value, in which a data line is not determined to be similar if the likeness value is below the threshold value. The threshold value may be a dynamic value. The threshold value may change based on the assigned likeness values. The data entry list may include one or more data lines that correspond, over a threshold value of similarity, to the set of search parameters. The threshold value may be used when no data lines match the identified/stated search parameters.

The methods may include searching in real-time through application logs. The methods may include searching through the application logs, as the applications are still executing. The real-time search enables the mainframe management system to search through up-to-date information. The real-time search enables the mainframe management system to effectively monitor, manage and maintain the mainframe network. The methods may include outputting, in real-time, the data entry list.

The methods may include displaying the data entry list on a display operating in tandem with or as a front end for the mainframe management system. The display may be a computing device. The computing device may be a laptop, smartphone, tablet, desktop or any other suitable computing device. The display may be a display device. The display may include flat screens, monitors, projectors or any other suitable display devices.

The methods may include receiving a message at the mainframe management system. The message may indicate a failure in one of the applications executing on the mainframe network. The methods may include generating a set of search parameters. The generated set of search parameters may correspond to the failure.

For example, the mainframe management system may detect a disconnection in an application executing on one of the nodes included in the mainframe network. The mainframe management system may transmit a message notifying a user/stakeholder of the mainframe management system of the disconnection at the application. The mainframe management system may generate search parameters that reflect the node in which the disconnection was found. The search parameters may include a data entry reflecting the disconnection. The search parameters may include a timeframe when the disconnection was located. The search parameters may include an application at which the disconnection was located. The mainframe management system may search, using the generated search parameters, a path to the disconnected application.

The methods may include executing a failure search. The failure search may be a search for the data entry corresponding the failure. The failure search may correspond to the generated set of search parameters. The failure search may access live data logs of the application in which the failure was identified. The failure search may identify a data entry list. The data entry list may include one or more data lines. The one or more data lines may correspond, over a threshold value of similarity, to the set of search parameters.

The methods may include outputting, in real-time, the data entry list. The methods may include displaying the data entry list on the display. The methods may include selecting from the data entry list a data line. The selected data line may include more than a threshold number of similar characteristics within an error margin to the failure. The error margin may be a percentage such as 5%, 10%, etc., a decimal number such as, 0.1, 0.2, 0.3 etc. and/or a whole number such as 1, 2 and 3 etc.

The methods may include identifying, at the mainframe management system, a remediation to the failure. The methods may include retrieving from a historical failure database, a set of remediations to historical mainframe network failures. The historical failure database may be included in the mainframe network. The historical failure database may store historical failures that the mainframe system has experienced. The historical failure database may also store historical remediations corresponding to the historical failures. The set of remediations may match the threshold number of similar characteristics within an error margin to the failure.

The methods may include comparing the failure to historical mainframe network failures retrieved from the historical failure database. The methods may include identifying a historical failure. The identified historical failure may include a highest number of similar characteristics to the failure. The methods may include identifying a corresponding remediation to the identified historical failure. The methods may include executing in real-time, at the application, the remediation to the failure.

The methods may include ignoring the indicated failure at the mainframe management system when the failure is determined to be effecting less than a predetermined number of applications. The methods may include ignoring the indicated failure when the mainframe management system fails to identify a historical failure remediation that includes the threshold number of similar characteristics within an error margin to the failure.

The method further includes transmitting a failure alert from the mainframe management system to the user and/or stakeholder of the mainframe management system. The failure alert may alert the user of the failure within the application. In the event that the mainframe management system initiated a remediation to the failure, the mainframe management system may not send a failure alert.

The methods further include executing the active and passive monitoring system using restructured extended executor ("REXX") and command list ("CLIST"). REXX may be a structured, high-level programming language designed for ease of learning and reading. REXX may be used to provide an easy-to-use and consistent interface across all applications included in the mainframe network. CLISTs may be command procedures. CLIST statements may enable a user to write structured programs, perform input and output ("I/O") functions, define and modify variables, and handle errors and attention interruptions. The methods may include executing the active and passive monitoring system using any other command methods provided by the mainframe management system.

The search parameters may include text formatted in regular expressions. Regular expression may include a sequence of characters that specifies a match pattern in text. Regular expressions may include a special text string for describing a search pattern. Regular expressions may include wildcards. The text may be formatted in regular expressions to make it readable for a user. The text may be formatted in any suitable form.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 3 shows yet another illustrative diagram in accordance with principles of the disclosure;

FIG. 5A shows yet another illustrative diagram in accordance with principles of the disclosure;

FIG. 5B shows yet another illustrative diagram in accordance with principles of the disclosure;

FIG. 6 shows yet another illustrative diagram in accordance with principles of the disclosure;

FIG. 7 shows yet another illustrative diagram in accordance with principles of the disclosure;

FIG. 8 shows yet another illustrative diagram in accordance with principles of the disclosure;

FIG. 9A shows yet another illustrative diagram in accordance with principles of the disclosure;

FIG. 9B shows yet another illustrative diagram in accordance with principles of the disclosure; and FIG. 10 shows still yet another illustrative diagram in accordance with principles of the disclosure.

DETAILED DESCRIPTION OF THE DISCLOSURE

Figure 1:
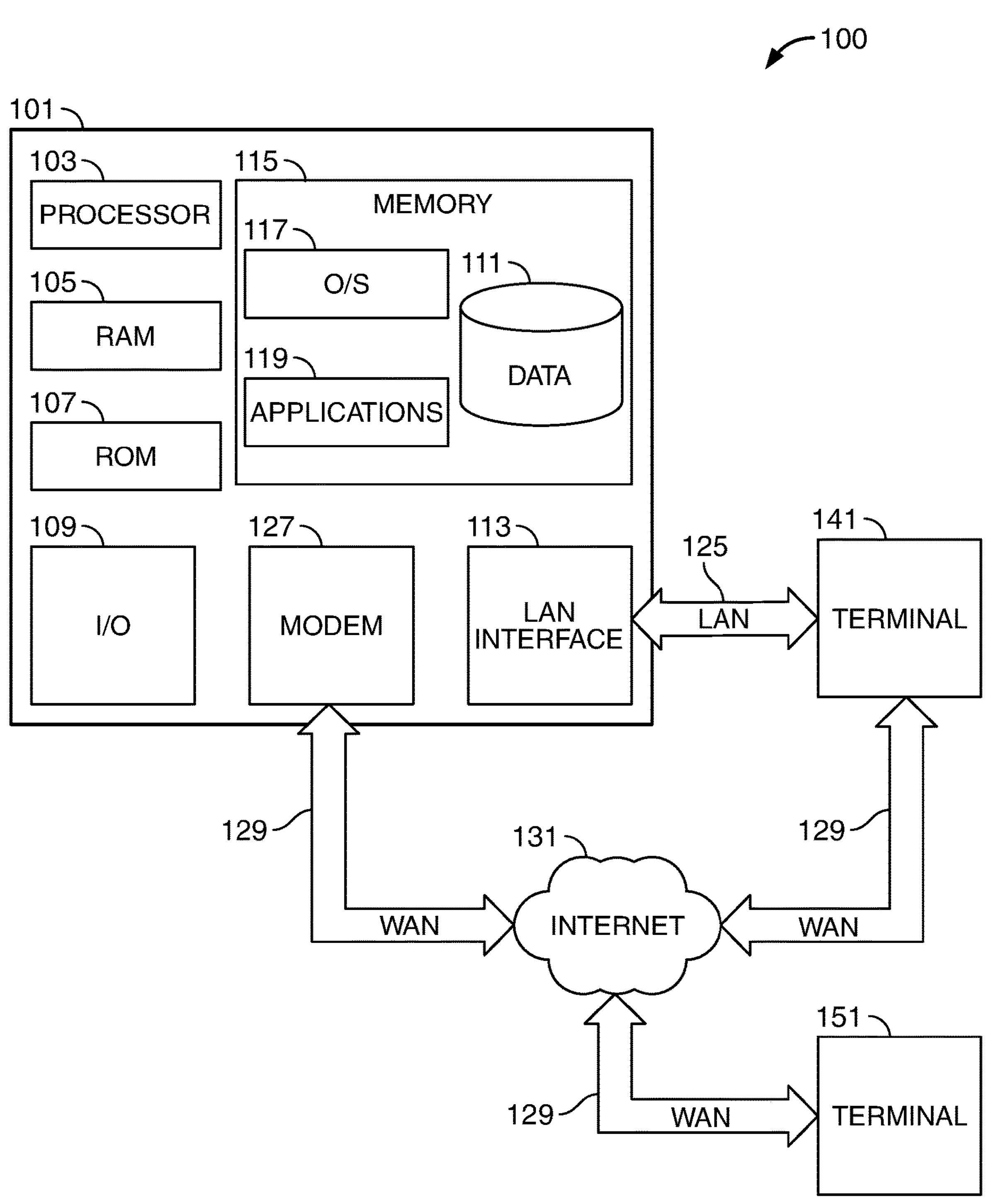
FIG. 1 shows an illustrative diagram in accordance with principles of the disclosure.

Apparatus, methods and systems for active and passive monitoring of a system is provided. The apparatus may include a mainframe network. The mainframe network may include a plurality of nodes. Each of the plurality of nodes may be a computing device. The computing devices may include desktops, laptops, printers, disk storages, peripheral devices and any other suitable computing devices. Each node included in the plurality of nodes may execute one or more applications.

The mainframe network may include one or more servers. The one or more servers may include processors that are configured to provide resources, data, services and/or programs to the one or more nodes included in the mainframe network. The one or more servers may be configured to process a high volume of transactions and/or input/output operations from the one or more nodes in parallel. The one or more servers may connect the one or more nodes. The nodes may be geographically dispersed—i.e., located in different geographical locations. The one or more servers may handle a high volume of input/output operations to disk storage, printers, peripheral devices and other suitable computing devices. The computing devices may or may not be physically linked to the one or more servers. The computing devices may or may not be wirelessly linked to the one or more servers. The one or more servers may enable the one or more nodes to execute one or more individual applications.

The one or more individual applications may complete many individual jobs, tasks and/or any suitable unit of work. Every job, task and/or unit of work may include a series of incremental activities. The mainframe management system may include a data logging application. The data logging application may provide supplementary job management, data management, and/or task management functions. The data logging application may log the series of incremental activities for each job. The data logging application may read/write input/output streams of incremental activities per job on auxiliary storage devices. The data logging application may read/write input and output streams of incremental activities per job on auxiliary storage devices concurrently with job execution. The data logging application may print the application logs for each job. The application logs for each job may be printed in a format convenient for later processing or output operations.

The apparatus may include a mainframe management system. The mainframe management system may monitor one or more applications being executed on the plurality of nodes. The mainframe management system may include a software platform for maintaining and automating the mainframe network from a single control point. The mainframe management system may include a software platform for managing and accessing the one or more individual applications being executed on the one or more nodes included in the mainframe network. The mainframe management system may include a software platform configured to access logs of one or more individual applications being executed on the one or more nodes included in the mainframe network, to gather session related information.

The mainframe management system may include a command-prompt interface. Each user/stakeholder of the mainframe management system may have a unique access code to access the command-prompt interface. The command-prompt interface may include a menu driven interface. The menu driven interface may include a collection of menus and panels. The collection of menus and panels may offer a range of functions to assist users/stakeholders in working with applications being executed through the mainframe network. The command-prompt interface may enable easy interaction with the operating system of the mainframe management system.

The mainframe management system may receive a set of search parameters. The set of search parameters may be generated by a user/stakeholder of the mainframe management system. The set of search parameters may be generated by the mainframe management system. The set of search parameters may be generated by any suitable program or application.

The set of search parameters may include a desired data entry. The desired data entry may be a computer host name, a user log-in code, an application access passcode, or any other suitable data entry. The set of search parameters may include a timeframe in which to search for the desired data entry. The timeframe may include a timeframe in which the desired data entry was active. The timeframe may be a minute, an hour, a day, a week, or any other suitable timeframe. The set of search parameters may include one or more applications in which to initiate a search for the desired data entry. The applications may include back-end or front-end programs being executed on the nodes included in the mainframe network. The set of search parameters may include any suitable set of search parameters.

The mainframe management system may input the set of search parameters into a search engine. The search engine may include a search and display application programming interface ("API"). The search and display API may enable users to monitor, control and view logs of the jobs occurring within the mainframe network. The search and display API may enable a user to view the logs of any job included in the mainframe network. The search and display API may enable a user to search for a string in the logs of all applications executing on the mainframe network. The search and display API may enable a user to enter commands. The search and display API may monitor, display and control job processing. The search and display API may monitor, display and control job printing.

The search engine may execute a search corresponding to the set of search parameters. The search may be for the desired data entry. The search may be limited by the timeframe identified in the set of search parameters. The search may access live data logs of each of the one or more applications identified in the set of search parameters.

The search engine may include an algorithm. The algorithm may be a rules-based decision-making algorithm. The algorithm may include a set of predefined rules to make decisions and perform tasks. The algorithm may include if-then rules to make decisions and perform tasks. The search function may use the algorithm to search through the live data logs of the applications to find data entries matching to the set of search parameters.

The search engine may identify a data entry list. The data entry list may include one or more data lines that correspond, over a threshold value of similarity, to the set of search parameters. Every data line determined to be within a range of the identified/stated search parameters may be assigned a likeness value. The likeness value may be a numerical value. The likeness value may be a numerical value such as a percentage. The likeness value may be any suitable numerical value. The numerical value may indicate a correspondence between the data line to the identified/stated search parameters. The higher the likeness value, the more likely it may be for a data line to match the identified/stated search parameters. For example, a likeness value for a data line that has a high level of correspondence to the identified search parameters may be 95%.

Based on the likeness values assigned to each data line, a threshold value of similarity may be determined. The threshold value of similarity may be determined by defining a cut-off value. The cut-off value may be a data value that a corresponding data line is not determined to be similar. The threshold value may be a dynamic value. The threshold value may change based on the assigned likeness values. The data entry list may include one or more data lines that correspond, over a threshold value of similarity, to the set of search parameters. The search engine may output, in real-time, the data entry list. The threshold value may be used when no data lines match the identified/stated search parameters.

The apparatus may include a display monitor. The display monitor may operate in tandem with or as a front end for the mainframe management system. The display monitor may be a computing device. The computing device may be a laptop, smartphone, tablet, desktop or any other suitable computing device. The display monitor may be a display device. The display may include a flat screen, monitors, projectors or any other suitable display devices. The display monitor may display the data entry list.

The mainframe management system may receive a message. The message may indicate a failure in one of the applications executing on the mainframe network. The mainframe management system may generate a set of search parameters corresponding to the failure. The failure may indicate a disconnection of a node, as such, the search parameters may be a set of search parameters identifying the host name of the node and the timeframe in which the failure message was received. The mainframe management system may use the search engine to execute a failure search. The failure search may correspond to the generated set of search parameters. The failure search may access live data logs of the application.

The search engine may identify a data entry list. The data entry list may include one or more data lines. The one or more data lines may correspond, over a threshold value of similarity, to the set of search parameters. The search engine may output, in real-time, the data entry list. The mainframe management system may select from the data entry list a data line, the selected data line comprising more than a threshold number of similar characteristics, within an error margin, to the failure. The error margin may be a percentage such as 5%, 10%, etc., a decimal number such as, 0.1, 0.2, 0.3 etc. and/or a whole number such as 1, 2 and 3 etc.

The mainframe management system may retrieve from a historical failure database, a set of remediations to historical mainframe network failures. The historical failure database may be included in the mainframe network. The historical failure database may store historical failures that the mainframe system has experienced. The historical failure database may also store historical remediations corresponding to the historical failures. The mainframe management system may retrieve a set of remediations matching the threshold number of similar characteristics within an error margin to the failure.

The mainframe management system may compare the failure to historical mainframe network failures from the historical failure database. The mainframe management system may identify a historical failure that includes a greatest number of similar characteristics to the failure. The mainframe management system may identify a corresponding remediation to the identified historical failure. The mainframe management system may execute in real-time, at the application, the remediation to the failure.

The mainframe management system may ignore the indicated failure when the failure is determined to be effecting less than a predetermined number of applications. The mainframe management system may ignore the indicated failure when the mainframe management system fails to identify a historical failure remediation that includes the threshold number of similar characteristics within an error margin to the failure.

The mainframe management system may transmit a failure alert to a user/stakeholder of the mainframe management system. The failure alert may alert the user of the failure within the application, in response to ignoring the failure. The mainframe management system may not transmit a failure alert to a user in response to executing a remediation to the failure.

The active and passive monitoring system may use restructured extended executor ("REXX") and command list ("C-List"). REXX may be a structured, high-level programming language designed for ease of learning and reading. REXX may be used to provide an easy-to-use and consistent interface across all applications included in the mainframe network. CLISTs may be command procedures. CLIST statements may enable a user to write structured programs, perform input/output ("I/O") functions, define and modify variables, and handle errors and attention interruptions. The active and passive monitoring system may use any other command methods provided by the mainframe management system.

The search parameters may include text formatted in regular expressions. Regular expression may include a sequence of characters that specifies a match pattern in text. Regular expressions may include a special text string for describing a search pattern. Regular expressions may include wildcards. The text may be formatted in regular expressions to make it useable for a user. The text may be formatted in any suitable form.

The mainframe management system may receive a partial set of search parameters. The partial set of search parameters may include one or two of one or more segments of a desired data entry, one or more segments of a timeframe for the desired data entry and one or more applications in which to initiate a search for the desired data entry. The partial set of search parameters may include a set of partial search parameters. Partial search parameters may include incomplete search parameters. The partial set of search parameters may include an incomplete set of search parameters.

The mainframe management system may input the partial set of search parameters into a search engine. The search engine may execute a search corresponding to the partial set of search parameters. The search engine may generate a data entry list. The data entry list may include one or more data lines that correspond, over a threshold number of similar characteristics, to the partial set of search parameters. The search engine may output, in real time, the data entry list The display monitor may display the data entry list.

The mainframe management system may execute a machine learning algorithm. The machine learning algorithm may be an algorithm that allows the mainframe management system to learn and make predictions from data. The machine learning algorithm may enable a user to select a data line corresponding to the partial set of search parameters from the data entry list. The machine learning algorithm may save a correlation between the partial set of search parameters and a selected data line at a database associated with the mainframe management system. The machine learning algorithm may use the database to identify corresponding data lines to future partial sets of search parameters.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the nodes, servers, computing devices, APIs, display monitors, databases and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. Memory 115 may also store videos, text and/or audio assistance files. nodes, servers, computing devices, APIs, display monitors, databases and any other suitable computing device as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
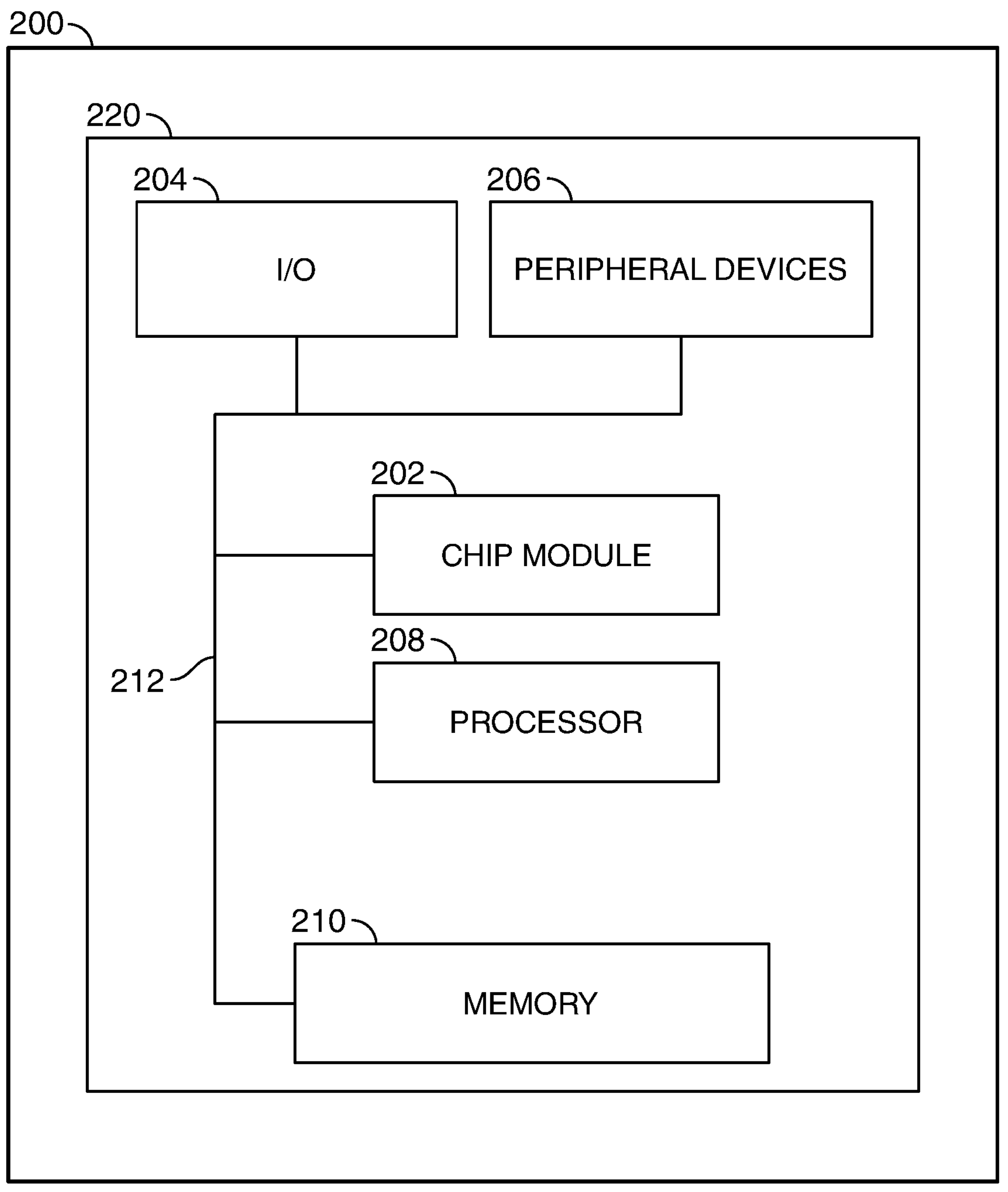
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3 shows standard opening page 302 of a mainframe management system. Standard opening page 302 may be a command line interface for the mainframe management system. Standard opening page 302 may include basic information regarding the mainframe management system. The mainframe management system may be a mainframe management system such as Mainframe View. The mainframe management system may be a mainframe management system such as that available from IBM®, Armonk, New York, under the name NetView. Standard opening page 302 may include basic information relating to a section of the mainframe which is being accessed. The section of the mainframe that is being accessed may have a user identifier of "LMT005K." Standard opening page 302 may include information regarding a transmission control protocol/Internet protocol ("TCP/IP") host name. The host name for TCPIP may be "6x04." Standard opening page 302 may include task information, time stamps and any other suitable opening page information.

Figure 4:
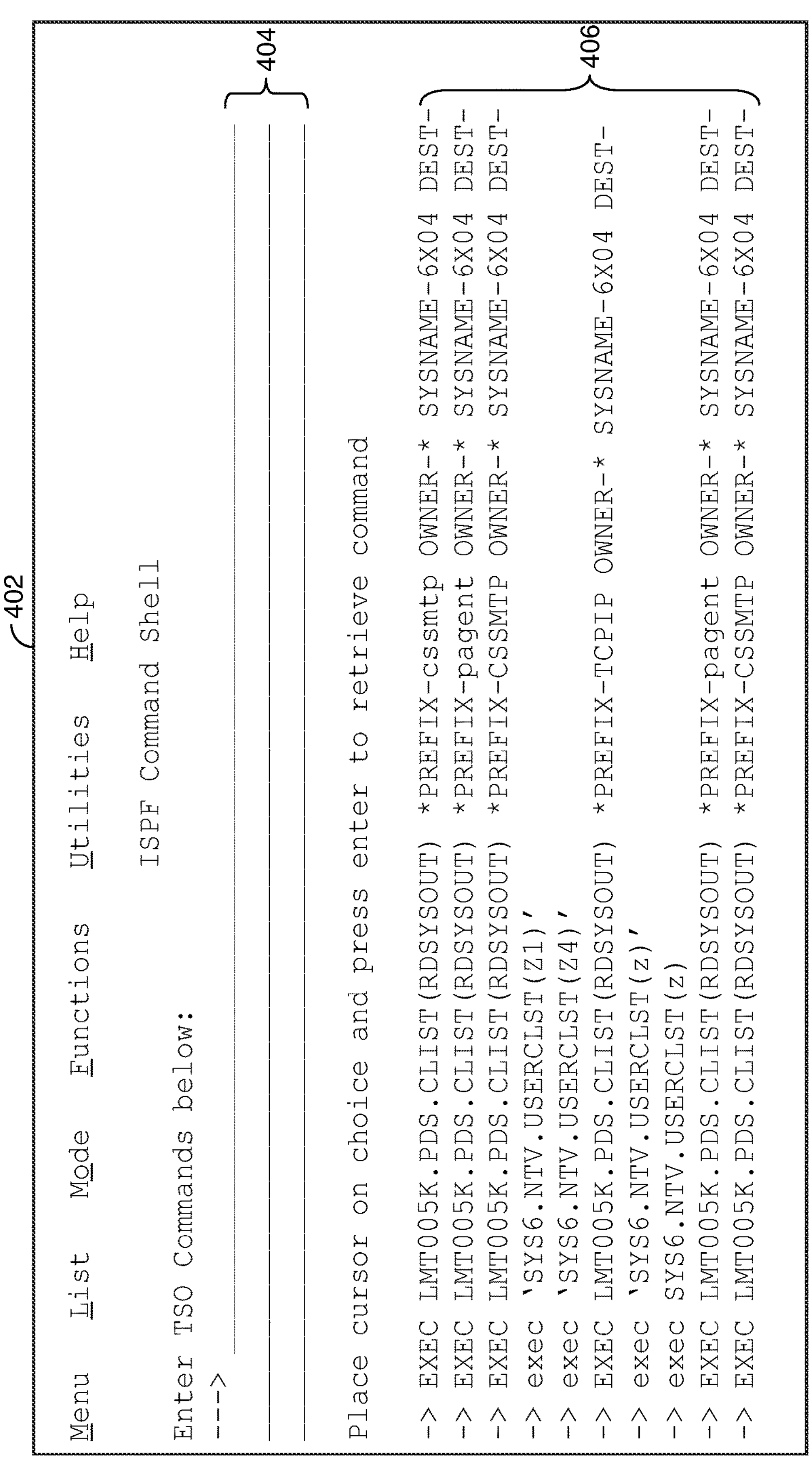
FIG. 4 shows yet another illustrative diagram in accordance with principles of the disclosure.

FIG. 4 shows a template shell 402. Template shell 402 may be a template shell for a command line application. Template shell 402 may include command executor 404. A user may enter a command into command executor 404. Template shell 402 may include command selections 406. A user may use template shell 402 to search for a desired data entry. The command executor may be a command executor such as that available from IBM®, Armonk, New York, under the name time sharing option/extension ("TSO/E"). The template shell may be a template shell such as that available from IBM®, Armonk, New York, under the name interactive system productivity facility ("ISPF").

Command selections 406 may include command presets. Command presets may include a location in which to search. The location may include a section of the mainframe. Command presets may include a domain name for the data entry that is being searched. For example, ".PDS" or ".NTV" may be a domain names. Command presets may include a format in which the response to the search is requested. For example, CLIST and USERCLIST may be formats in which the response is requested. Command presets may include parameters for the search. For example, parameters may include "RDSYSOUT", "Z1," "Z4," and "z".

Command presets may be exemplary commands for a user to mimic the format. Command presets may include a prefix. The prefix may include a type of record. The prefix may identify the type of protocol with which the record complies. The prefix may include communications server simple mail transfer protocol ("SMTP"). The prefix may include TCPIP. The prefix may include a policy agent ("PAGENT"). PAGENT may determine how to apply specific protocols by comparing several possible attributes of a connection attempt to a set of rules. Command presets may include an owner. The owner may be a user associated with the record. The owner may be identified as "*" Command presets may include a system name. The system name may be a system associated with the record. The system name may be a system name such as, "6X04."

FIGS. 5A and 5B show application data log 502. Application data log 502 may show a list of time stamps. The time stamps may indicate different actions executed at different times. Application data log 502 may include a list of actions completed in the application.

FIG. 6 shows search results 602. A user may initiate a search through a plurality of application logs. The search may output search results 602. Search results 602 may list a list of host names. The list may include a list of host names that are similar to the host name for which the search was initiated. The list may include a list of host names that correspond to parameters identified/stated in the search.

FIG. 7 shows code 702. Code 702 may include computer search code. The computer search code may print any entries that match the input search parameters. If there is no match to the search parameters, the output may be a failed match output. The search parameters may identify a prefix. The prefix may be identified as protocol, such as 'CSSMTP.' The search parameters may identify an owner. The owner may be identified as '*' The search parameters may identify a system name. The system name may be a system name such as '6X04.' The computer search code may include search commands such as, "ISFEXEC." The ISFEXEC may create a variable search through data logs for the identified search parameters. When there is no match (lrc< >0) to the input search parameters then the system will output a failed message. When there is a match to the input search parameters, the search code may output a token, identifying the data entry as a match.

FIG. 8 shows an illustrative health check 802. Health check 802 may check the status of an application. Health check 802 may check if resources of the application are all active. Health check 802 may identify the physical unit name, the status of the physical unit, the control program name, the network identification, transmission group, remote-IP-address, major node, and type for any errors, disconnection or any suitable mainframe network related problem. Health check 802 may identify if there is an error in the application.

Figure 9B:
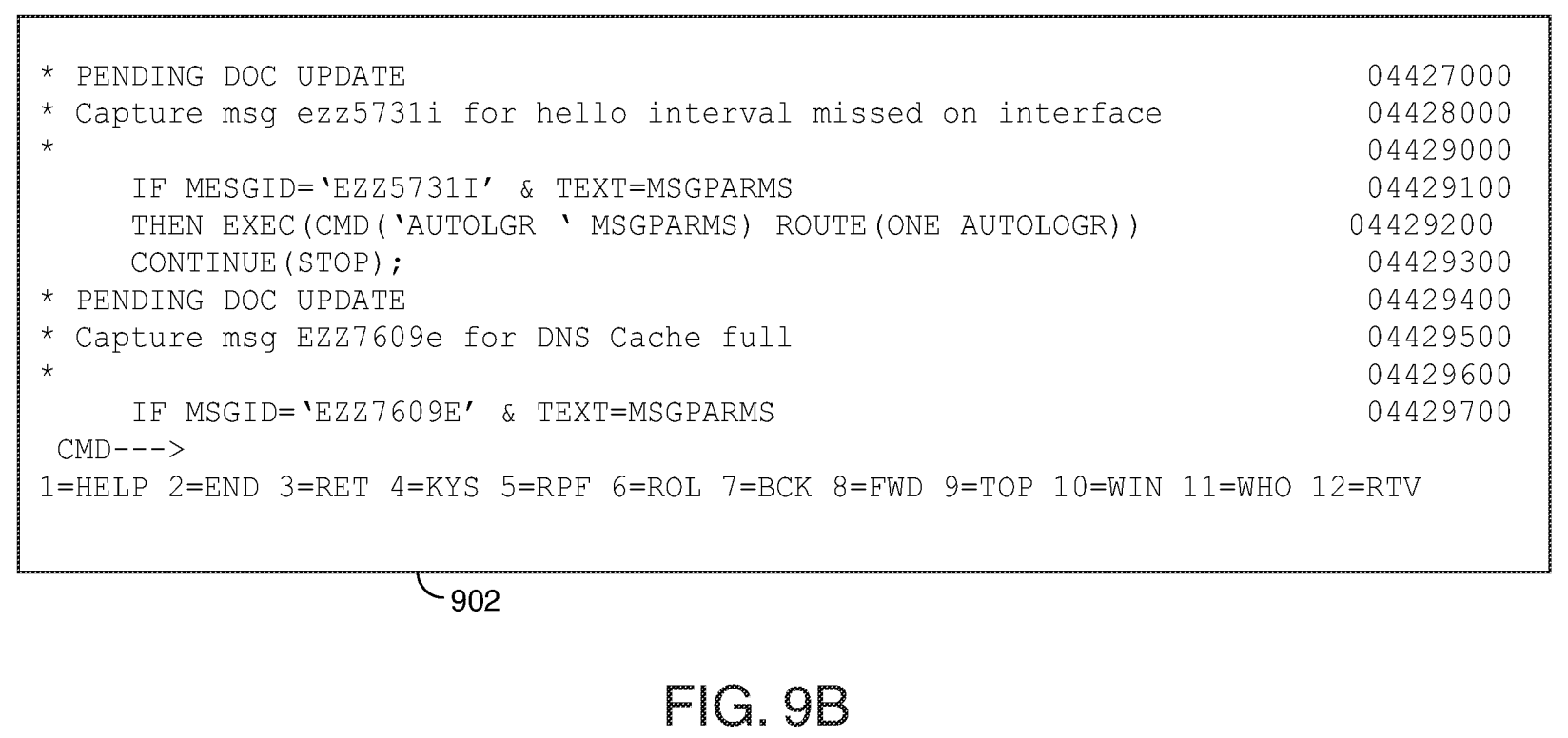

FIGS. 9A and 9B show code 902. Code 902 may be used to search through updated or deleted data logs. Code 902 may use message identifiers ("MSGID") such as "BNH464E" or "EZZ1538I" and message parameters ("MSGPARMS") to identify data logs to be updated or deleted. Code 902 may use commands such as "AUTOLGR" to initiate an automation relating to the data log. The automation may include automatic updating of the data log. The automation may include automatic deletion of the data log.

Figure 10:
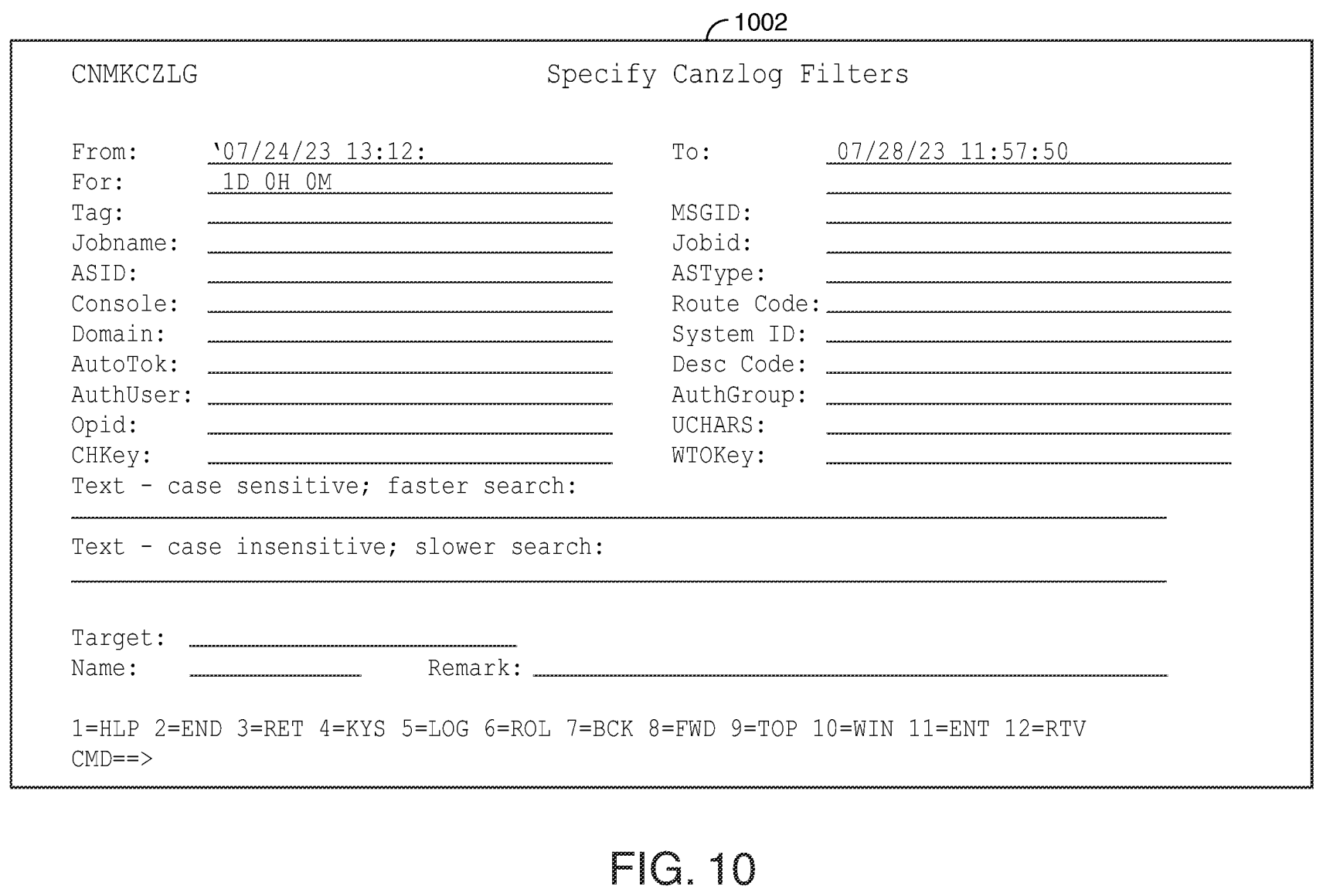

FIG. 10 shows user search interface 1002. User search interface may include a plurality of fields. The plurality of fields may be used to search for a specific data entry. The plurality of fields may include timeframe fields, "FROM" and "TO," which enable a user to input parameters identifying a timeframe in which to search for the data entry. The plurality of fields may include data entry field, "FOR," which enables a user to input a data entry for which to initiate a search. The plurality of fields may include different identification fields such as "Tag," "MSGID" (message identification), "Jobname," "Jobid" (job identification), "ASID" (address space identifier), "AStype" (address type), "Console," "Route Code," "Domain," "System ID," "AutoTok" (auto token), "Desc Code" (descriptor code) "AuthUser" (authorized user), "AuthGroup" (authorized group), "Opid" (operator identifier), "UCHARS" (user characters) "CHKey" (change encryption key), "WTOkey" (write to operator key) and any other suitable fields. The identification fields may be used to identify a specific data entry within application logs of different applications being executed on nodes included in the mainframe network. A user may use some or all of the identification fields when searching for a data entry.

Search interface 1002 also includes custom fields, such as "Text—case sensitive; faster search," and "Text—case sensitive; slower search." The custom fields may enable a user to entry any suitable text to be used as search parameters.

Thus, methods and apparatus for REAL-TIME MAINFRAME NETWORK MANAGEMENT are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. An active and passive monitoring system comprising:
- a mainframe network, the mainframe network comprising a server including a hardware processor, the server in communication with a plurality of computing devices, the plurality of computing devices comprising a desktop computer, laptop computer, disk storage and printer, each of the desktop computer, laptop computer, disk storage and printer executing instructions using parallel processing, the server configured to process:
  - a first volume of output transmissions, over wireless communication lines, of computing resources, data, computing services and application programs to the desktop computer;
  - a first input stream of a first job log comprising a first series of incremental activities for each job operating on the desktop computer said first job log being formatted in a first pre-print format;
  - a second volume of output transmissions, over wireless communication lines, of computing resources, data, computing services and application programs to the laptop computer;
  - a second input stream of a second job log comprising a second series of incremental activities for each job operating on the laptop computer, said second job log being formatted in a second pre-print format;
  - a third volume of output transmissions, over wireless communication lines, of computing resources, data, computing services and application programs to the disk storage;
  - a third input stream of a third job log comprising a third series of incremental activities for each job operating on the disk storage, said third job log being formatted in a third pre-print format;
  - a fourth volume of output transmissions, over wireless communication lines, of computing resources, data, computing services and application programs to the printer; and
  - a fourth input stream of a fourth job log comprising a fourth series of incremental activities for each job operating on the printer, said fourth job log being formatted in a fourth pre-print format;
- a mainframe management system operating on the mainframe network, the mainframe management system comprising:
  - a data logging application configured to:
    - log a plurality of application logs comprising the first job log, the second job log, the third job log and the fourth job log;
    - print the plurality of application logs into a post-print format, the post-print format ingestible by the mainframe management system for output operations; and
    - continually store the plurality of application logs in the post-print format on an auxiliary storage device; and
  - a search and display application programming interface ("SDAPI") configured to electronically access the plurality of application logs;

wherein:
- in a first stage, the mainframe management system is operable to:
  - receive, via the SDAPI, a set of search parameters, the set of search parameters being received as text formatted in regular expressions, the set of search parameters comprising:
    - a desired data entry;
    - a timeframe for the desired data entry; and
    - one or more applications in which to initiate a search for the desired data entry;

input the set of search parameters into a search engine, the search engine operable to:

execute a search corresponding to the set of search parameters, the search being executing in real-time, the search being executed for the desired data entry, the search being limited by the time-frame identified in the set of search parameters, the search accessing, via the SDAPI, the application logs stored at the auxiliary storage device of each of the one or more applications identified in the set of search parameters;

identify a data entry list, the data entry list comprising one or more data lines that correspond, over a threshold value of similarity, to the set of search parameters; and output, in real-time, the data entry list; and display the data entry list via the SDAPI; and in a second stage, the mainframe management system is further configured to:

receive a message indicating a failure in an application executing on the mainframe network;

generate a second set of search parameters corresponding to the failure;

execute a failure search, the failure search corresponding to the second set of search parameters, the failure search accessing the plurality of application logs;

identify a second data entry list, the second data entry list comprising one or more data lines, said one or more data lines corresponding, over a threshold value of similarity, to the second set of search parameters;

output, in real-time, the second data entry list;

select from the second data entry list a data line, the selected data line comprising more than a threshold number of similar characteristics within an error margin to the failure;

retrieve from a historical failure database, a set of remediations to historical mainframe network failures, the set of remediations matching the threshold number of similar characteristics within an error margin to the failure;

compare the failure to historical mainframe network failures from the historical failure database;

identify a historical failure that includes a greatest number of similar characteristics to the failure;

identify a corresponding remediation to the identified historical failure;

in response to determining that the failure is affecting more than a predetermined number of applications, execute in real-time, at the application, the remediation to the failure; and in response to a determination that the failure is affecting less than a predetermined number of applications, ignore the failure.

2. The active and passive monitoring system of claim 1 wherein the mainframe management system is further configured to ignore the failure when the mainframe management system fails to identify a historical failure remediation that includes the threshold number of similar characteristics within an error margin to the failure.

3. The active and passive monitoring system of claim 2 wherein the mainframe management system is further configured to transmit a failure alert to a user, the failure alert alerting the user of the failure.

4. The active and passive monitoring system of claim 1 further configured to execute restructured extended executor ("REXX") and command list ("C-List").

5. The active and passive monitoring system of claim 1 wherein the search is based on a rules-based decision-making algorithm.

6. An active and passive monitoring system comprising:

a mainframe network, the mainframe network comprising a server including a hardware processor, the server in communication with a plurality of computing devices, the plurality of computing devices comprising a desktop computer, laptop computer, disk storage and printer, each of the desktop computer, laptop computer, disk storage and printer executing instructions using parallel processing, the server configured to process:

a first volume of output transmissions, over wireless communication lines, of computing resources, data, computing services and application programs to the desktop computer;

a first input stream of a first job log comprising a first series of incremental activities for each job operating on the desktop computer said first job log being formatted in a first pre-print format;

a second volume of output transmissions, over wireless communication lines, of computing resources, data, computing services and application programs to the laptop computer;

a second input stream of a second job log comprising a second series of incremental activities for each job operating on the laptop computer, said second job log being formatted in a second pre-print format;

a third volume of output transmissions, over wireless communication lines, of computing resources, data, computing services and application programs to the disk storage;

a third input stream of a third job log comprising a third series of incremental activities for each job operating on the disk storage, said third job log being formatted in a third pre-print format;

a fourth volume of output transmissions, over wireless communication lines, of computing resources, data, computing services and application programs to the printer; and a fourth input stream of a fourth job log comprising a fourth series of incremental activities for each job operating on the printer, said fourth job log being formatted in a fourth pre-print format;

a mainframe management system operating on the mainframe network, the mainframe management system comprising:

a data logging application configured to:

log a plurality of application logs comprising the first job log, the second job log, the third job log and the fourth job log;

print the plurality of application logs into a post-print format, the post-print format ingestible by the mainframe management system for output operations; and continually store the plurality of application logs in the post-print format on an auxiliary storage device; and a search and display application programming interface ("SDAPI" configured to electronically access the plurality of application logs;

wherein:

in a first stage, the mainframe management system is operable to:

receive, via the SDAPI, a partial set of search parameters, the partial set of search parameters being received as text formatted in regular expressions, the partial set of search parameters comprising one or two of the following:

one or more segments of a desired data entry;

one or more segments of a timeframe for the desired data entry;

one or more applications in which to initiate a search for the desired data entry;

input the partial set of search parameters into a search engine, the search engine operable to:

execute a search corresponding to the partial set of search parameters, the search accessing, via the SDAPI, the application logs stored at the auxiliary storage device, the search being executed in real-time;

generate a data entry list, the data entry list comprising one or more data lines that correspond, over a threshold number of similar characteristics, to the partial set of search parameters; and output, in real-time, the data entry list; and display the data entry list via the SDAPI; and in a second stage, the mainframe management system is further configured to:

in response to an indication of a failure occurring within the mainframe network, select from the data entry list a data line, the selected data line comprising more than a threshold number of similar characteristics within an error margin to the failure;

retrieve from a historical failure database, a set of remediations to historical mainframe network failures, the set of remediations matching the threshold number of similar characteristics within an error margin to the failure;

compare the failure to historical mainframe network failures from the historical failure database;

identify a historical failure that includes a greatest number of similar characteristics to the failure;

identify a corresponding remediation to the identified historical failure;

in response to determining that the failure is affecting more than a predetermined number of applications, execute in real-time, at the application, the remediation to the failure; and in response to a determination that the failure is affecting less than a predetermined number of applications, ignore the failure.

7. The active and passive monitoring system of claim 6 the mainframe management system further configured to execute a machine learning algorithm; the machine learning algorithm configured to:

enable a user to select a data line corresponding to the partial set of search parameters from the data entry list;

save a correlation between the partial set of search parameters and a selected data entry at a database associated with the mainframe management system; and use the database to identify corresponding data lines to future partial sets of search parameters.

* * * * *